J. E. McGINNESS.
DAMPER FOR HEATING AND VENTILATING SYSTEMS.
APPLICATION FILED JAN. 13, 1911.
1,009,769.
Patented Nov. 28, 1911.
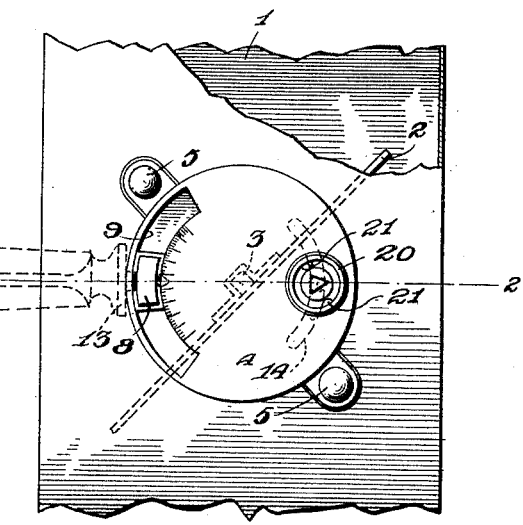
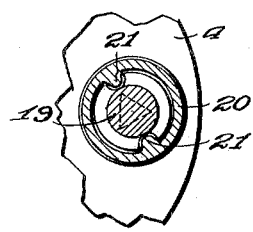
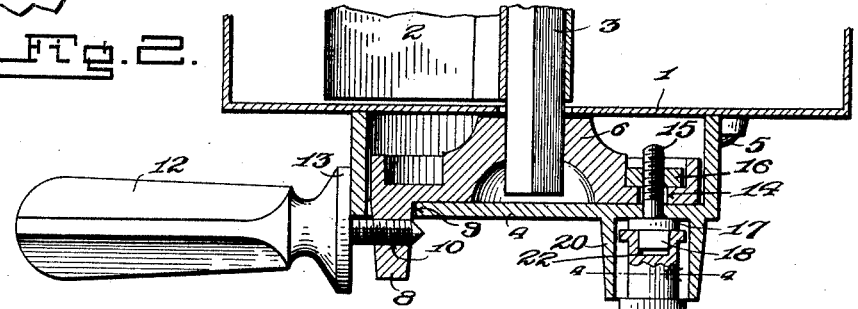
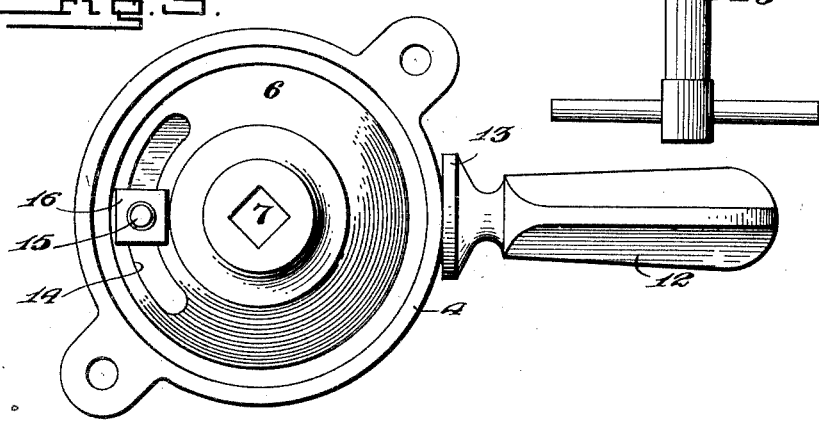
WITNESSES
INVENTOR

UNITED STATES PATENT OFFICE.

JOSEPH E. McGINNESS, OF PITTSBURGH, PENNSYLVANIA.

DAMPER FOR HEATING AND VENTILATING SYSTEMS.

1,009,769.  Specification of Letters Patent.  Patented Nov. 28, 1911.

Application filed January 13, 1911. Serial No. 602,450.

*To all whom it may concern:*

Be it known that I, JOSEPH E. MC-GINNESS, a resident of Pittsburgh, in the county of Allegheny and State of Pennsylvania, have invented a new and useful Improvement in Dampers for Heating and Ventilating Systems, of which the following is a specification.

This invention relates to dampers for heating and ventilating systems, or for smoke pipes and the like.

The object of the invention is to provide a damper with means to set the same and prevent unauthorized tampering therewith, and also with means for conveniently holding the same in set position while testing the system.

The invention comprises the construction and arrangement of parts hereinafter described and claimed.

In the accompanying drawings Figure 1 is a side view of a flue showing a damper therein and my invention applied thereto; Fig. 2 is a sectional view of the damper locking means on the line 2—2, Fig. 1; Fig. 3 is an inside view of the locking means; and Fig. 4 is a detail sectional view of the key and key guide taken on the line 4—4, Fig. 2.

In the drawings 1 indicates a flue either for hot air for heating, or cold air for ventilating, such as used in buildings which are heated and ventilated by hot air systems, or for smoke, or other gases. This flue may be either circular, square, rectangular or of other suitable cross section.

The damper is indicated at 2 and is of what is known as the butter-fly type, being secured midway of its edges to the shaft or axle 3, the ends of which form trunnions upon which said damper swings. The ends of this shaft or axle extend through suitable holes in the side walls of the flue as is the usual custom, so that by turning said shaft or axle the damper can be set at any desired angle in the flue, so as to more or less obstruct the passage through the latter. Heretofore it has been the practice to provide the end of the shaft or axle with a handle or the like which is accessible to every one and by means of which the damper can be set at any desired angle. Sometimes, but not always, means have been provided for engaging the handle so as to prevent the damper from moving under the flow of air through the flue. With such prior devices however, unauthorized or curious persons are liable to change the setting of the damper and therefore disturb the equalizing of the heating or ventilating system. It is of course well known that in all hot air systems the distribution of air through the flues is not uniform, and that the dampers must be quite accurately set in order to maintain the desired flow of air through the various flues. Consequently any tampering by unauthorized or unskilled persons with the dampers, is liable to derange the entire system to a great extent.

The present invention is designed to provide means for accurately setting the damper and holding it while testing the system to see whether the damper is properly set, and which when properly set can be locked so that it cannot be altered by an unauthorized individual. This is accomplished by the following means. Secured to the outside of the flue is a suitable casing 4 which may be attached to the flue so that it cannot be readily removed, such for instance as by rivets, bolts or the like 5. This casing is of general circular form, and inclosed within it is a rotary member 6 which is provided with a square or other shaped hole 7 for receiving a similarly shaped end of the shaft or axle 3, so that the latter must rotate with the member 6. This rotary member is provided with a lug 8 which projects outwardly through an arc-shaped slot 9 in the casing 4, and is provided with a threaded hole 10 for receiving a threaded extension 11 of handle 12, the latter being provided with a flange or head 13 adapted to bear against the periphery of the casing 4. It will be readily seen that when the handle is screwed into the lug 8 the shoulder or head 13 is brought tightly against the periphery of the casing 4, thereby locking the rotary member 6 in the casing. This is utilized when testing the system and setting the damper. For instance the damper will be moved to the position thought to be right for that particular flue, and the handle 12 then screwed into the lug 8 until the head 13 of the handle binds tightly against the periphery of the casing. This insures the damper remaining accurately in that position until tests are made to determine whether the right quantity of air is flowing through the flue. If the damper is not properly set the handle is slightly unscrewed and moved in one direction or the other to set the damper at a new position, the handle then again screwed tight to lock the damper in this position for further test, and this is continued until the damper has been brought to the correct position. Hence in testing, the damper cannot accidentally move out of adjusted position by the flow of air through the flue or for other causes. The end 11 of the handle is preferably pointed and acts in conjunction with graduations on the casing to facilitate setting the damper.

To prevent unauthorized tampering with the damper there is provided a key controlled lock for the rotary member 6. This may be of any desired construction and is shown in the drawings of very simple form. As illustrated the rotary member 6 is provided with an arc-shaped slot 14 through which extends a threaded rod 15 on which is a nut 16 located inside of rotary member 6. The threaded rod 15 extends through a hole in the outer wall of casing 4 and is there provided with a collar or enlargement 17 which prevents this rod from moving inwardly. The outer end 18 of the rod is of triangular or other shape for receiving a suitable key 19. This outer end of the rod is located in a socket or sleeve 20, which on its inner face is provided with projections 21 or other means which co-act with grooves 22 in the key to prevent the insertion of any form of key. It will be obvious that with the proper key this rod can be rotated to tighten the nut 16 thereon and lock the rotary member 6 to the casing 4. This locks the damper in its adjusted position and in a manner so that it cannot be moved except by a person provided with a proper key. The handle 12 is used in adjusting the damper as heretofore described, and constitutes convenient means for not only moving the damper, but also for quickly locking it in position for testing. When the damper has been set to its final adjusted position it is permanently locked by means of the key 19 acting on the threaded rod 15 and nut 16. When permanently locked, the handle 12 is removed and carried away. This insures the damper remaining in that position until it is changed by an authorized person.

What I claim is:

1. The combination with a flue, of a damper pivotally mounted therein and provided with an operating stem extending through the flue wall, a handle connected to said stem for operating the damper and being detachable therefrom, a lock for securing said stem to a fixed part of the flue to prevent movement of said stem, and a shaped key coöperating with said lock and being entirely separate therefrom and removable therefrom.

2. The combination with a flue, of a damper mounted therein and having an operating stem extending through the flue wall, a casing secured to a flue wall and concealing the projecting end of said stem and provided with a shaped key socket, a removable key shaped to fit said socket and coöperating with said stem, and means in the casing controlled by said key when in said socket and arranged to lock said stem against unauthorized movement.

3. The combination with a flue, of a damper pivotally mounted therein and having an operating shaft extending through a flue wall, a rotary member attached to said shaft, a casing concealing said rotary member and provided with a shaped key socket, a removable key fitting said socket and coöperating with said stem, and means in said casing controlled by said key when in said socket and arranged to lock said rotary member to said casing.

4. The combination with a flue, of a damper pivotally mounted therein and having an operating shaft extending through the wall of the flue, an operating member on the outer end of said stem, a casing inclosing said operating member, said operating member being provided with a projection extending through a segmental slot in said casing, and a handle having a threaded engagement with said projection and serving to move said rotary member and also as a means to lock said rotary member to said casing.

5. The combination with a flue, of a damper pivotally mounted therein and having a shaft extending through the wall of the flue, a disk on the outer end of said shaft, a casing inclosing said disk and provided with a segmental slot, a projection on said disk extending through said segmental slot and provided with a threaded opening, and a handle engaging said threaded opening and provided with a shoulder to engage the outer face of the casing and lock said disk to said casing.

6. The combination with a flue, of a damper pivotally mounted therein and having a shaft extending through the wall of the casing, a disk on the outer end of said shaft and provided with a segmental slot, a threaded rod rotatably mounted in the casing and extending through said slot and being immovable endwise, a nut on said threaded rod, and a key opening through the casing whereby the key may be made to engage said threaded rod.

7. The combination with a flue, of a damper therein, a rotary shaft on which said damper is mounted, said shaft extending through the wall of the flue, a disk on the outer end of said shaft and provided with a segmental slot, a casing inclosing said disk and provided with a key opening and with a segmental slot, a rotary member endwise immovable in the casing and extending through the segmental slot in said disk, a nut on said threaded member, said threaded member having its outer end arranged for engagement by a key through the key hole opening in the casing, a projection on the disk extending through the segmental slot in the casing and provided with a threaded hole radial to the axis of the disk, and a handle having a threaded extension for engaging said hole and provided with a shoulder for engaging the periphery of the casing.

In testimony whereof, I have hereunto set my hand.

JOSEPH E. McGINNESS.

Witnesses:
O. A. ROEHLING,
MARY E. CAHOON.

Copies of this patent may be obtained for five cents each, by addressing the "Commissioner of Patents, Washington, D. C."